US011128203B2

(12) United States Patent
Shim et al.

(10) Patent No.: US 11,128,203 B2
(45) Date of Patent: Sep. 21, 2021

(54) MOTOR

(71) Applicant: LG INNOTEK CO., LTD., Seoul (KR)

(72) Inventors: Woo Seob Shim, Seoul (KR); Hun Jung Kim, Seoul (KR); Seong Hun Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 310 days.

(21) Appl. No.: 16/301,284

(22) PCT Filed: May 2, 2017

(86) PCT No.: PCT/KR2017/004656
§ 371 (c)(1),
(2) Date: Nov. 13, 2018

(87) PCT Pub. No.: WO2017/196020
PCT Pub. Date: Nov. 16, 2017

(65) Prior Publication Data
US 2019/0165656 A1 May 30, 2019

(30) Foreign Application Priority Data

May 10, 2016 (KR) .................. 10-2016-0056987
Jan. 23, 2017 (KR) .................. 10-2017-0010519

(51) Int. Cl.
*H02K 13/10* (2006.01)
*H01R 39/04* (2006.01)
(Continued)

(52) U.S. Cl.
CPC ............. *H02K 13/10* (2013.01); *H01R 39/04* (2013.01); *H01R 39/18* (2013.01); *H01R 39/26* (2013.01);
(Continued)

(58) Field of Classification Search
CPC .......... H02K 5/14–5/148; H02K 13/00; H02K 13/006; H02K 13/10; H02K 39/18–39/27
See application file for complete search history.

(56) References Cited

U.S. PATENT DOCUMENTS

2009/0108698 A1    4/2009    Guan et al.

FOREIGN PATENT DOCUMENTS

CN    101420154 A    4/2009
CN    201570951 U    9/2010
(Continued)

OTHER PUBLICATIONS

Office Action dated Jul. 23, 2019 in Chinese Application No. 201780028898.5.
(Continued)

*Primary Examiner* — Ramon M Barrera
(74) *Attorney, Agent, or Firm* — Saliwanchik, Lloyd & Eisenschenk

(57) ABSTRACT

The present invention provides a motor comprising: a rotary shaft; a rotor including a hole in which the rotary shaft is disposed; a stator disposed on the outer side of the rotor; and a housing for accommodating the rotor and the stator, and further comprising a rectifier having a hole in which the rotary shaft is disposed, wherein the housing includes a cover plate, the cover plate includes a brush coming into contact with the rectifier, and the front surface of the brush includes a curved part coming into contact with the rectifier, and a cutting part formed to be bent from the curved part such that the cutting part does not come into contact with the rectifier, thereby providing an advantageous effect of inhibiting the worn foreign material of the brush from being generated on a contact portion between the brush and the rectifier during the initial driving of the motor.

1 Claim, 8 Drawing Sheets

(51) Int. Cl.
*H02K 13/00* (2006.01)
*H01R 39/26* (2006.01)
*H01R 39/18* (2006.01)
*H01R 39/46* (2006.01)

(52) U.S. Cl.
CPC ............. *H01R 39/46* (2013.01); *H02K 13/00* (2013.01); *H02K 13/006* (2013.01)

(56) References Cited

FOREIGN PATENT DOCUMENTS

| | | | |
|---|---|---|---|
| EP | 2 020 710 A1 | | 2/2009 |
| JP | 62-118732 A | | 5/1987 |
| JP | H10-23716 A | | 1/1998 |
| JP | 2006-340431 A | | 12/2006 |
| JP | 2007-225678 A | | 9/2007 |
| JP | 2007-282362 A | | 10/2007 |
| KR | 10-2004-011088 A | | 12/2004 |
| KR | 2008020226 | * | 3/2008 |
| KR | 10-2009-0114069 A | | 11/2009 |
| KR | 10-2014-0003674 A | | 1/2014 |

OTHER PUBLICATIONS

International Search Report in International Application No. PCT/KR2017/004656, filed May 2, 2017.
Supplementary Partial European Search Report dated May 21, 2019 in European Application No. 17796320.4.

* cited by examiner

MOTOR

CROSS-REFERENCE TO RELATED APPLICATIONS

This application is the U.S. national stage application of International Patent Application No. PCT/KR2017/004656, filed May 2, 2017, which claims the benefit under 35 U.S.C. § 119 of Korean Application Nos. 10-2016-0056987, filed May 10, 2016, and 10-2017-0010519, filed Jan. 23, 2017, the disclosures of each of which are incorporated herein by reference in their entirety.

TECHNICAL FIELD

The present invention relates to a motor.

BACKGROUND ART

A motor includes a rotating shaft formed to be rotatable, a rotor combined with the rotating shaft, and a stator fixed to an inside of a housing. The stator is disposed along a perimeter of the rotor with a gap therebetween. The motor induces rotation of the rotor by an electrical interaction. When a coil is wound on the rotor, a commutator and a brush are provided to supply an electric current to the coil wound on the rotor.

Generally, the commutator is combined with the rotating shaft and rotates while being connected to the coil, and the brush is combined with the housing and is disposed to come into contact with the commutator. Here, the brush comes into contact with the commutator and supplies electricity.

A front surface of the brush may have a curved surface corresponding to a curved surface of a commutator piece. Generally, a curvature radius of the front surface of the brush may be initially formed to be greater than a curvature radius of the commutator. This is to cause surface contact between the commutator and the front surface of the brush in consideration of abrasion of the front surface of the brush. However, foreign substances occur due to abrasion of the brush in an initial driving state of the motor. There is a problem in which the generated foreign substances intervene between the commutator and the brush and increase contact resistance such that performance of the motor is decreased. To solve the problem, the curvature radius of the commutator and the front surface of the brush may be configured to be equal. However, due to assembling toleration, both edges of the brush come into contact with the commutator before the front surface of the brush comes into contact with the commutator. Accordingly, a problem, in which the both edges of the brush are broken and generate foreign substances, occurs.

Meanwhile, when the rotor rotates, vibrations may occur due to an error of out-of-roundness of the commutator. On the basis of a radial direction of the motor, vibrations may be absorbed by an elastic member supporting a rear end of the brush. However, there is a problem of being vulnerable to vibrations on the basis of an axial direction of the motor. Due to vibrations, a slip may occur between the brush and the commutator in the axial direction of the motor. When the slip occurs, a problem occurs in which contact resistance between the brush and the commutator increases such that current efficiency is decreased.

DISCLOSURE

Technical Problem

The present invention is directed to providing a motor capable of inhibiting occurrence of foreign substances caused by abrasion of a brush at a contact part between the brush and a commutator while the motor is initially driven.

The present invention is also directed to providing a motor which inhibits a slip phenomenon which may occur between the commutator and the brush due to vibrations on the basis of an axial direction of the motor.

Aspects of embodiments are not limited to the above-stated aspects and unstated other aspects can be clearly understood by those skilled in the art from the following description.

Technical Solution

One aspect of the present invention provides a motor including a rotating shaft, a rotor including a hole in which the rotating shaft is disposed, a stator disposed outside the rotor, a housing which accommodates the rotor and the stator, and a commutator including a hole in which the rotating shaft is disposed. Here, the housing includes a cover plate. The cover plate includes a brush which comes into contact with the commutator. A front surface of the brush includes a curved portion, which comes into contact with the commutator, and cutting portions which are formed by being bent at the curved portion and do not come into contact with the commutator.

The curved portion may be disposed in a center on the basis of a width direction of the brush, and the cutting portions may be disposed on both sides of the curved portion on the basis of the width direction of the brush.

The cutting portions may be flat surfaces.

A curvature radius of the curved portion may be equal to a curvature radius of the commutator.

The cutting portions may be symmetrically disposed on the basis of a first reference line which passes a center of the commutator and a center of the curved portion.

The cutting portions may be disposed opposite to the commutator on the basis of a reference circle formed along an outer circumferential surface of the commutator and a second reference line which is a tangent at an intersection point between corners which are boundaries between the curved portion and the cutting portions.

The cutting portions may be located to be inclined on the basis of a third reference line which is perpendicular to the first reference line and passes the intersection point.

Another aspect of the present invention provides a motor including a rotating shaft, a rotor including a hole in which the rotating shaft is disposed, a stator disposed outside the rotor, a housing which accommodates the rotor and the stator, and a commutator including a hole in which the rotating shaft is disposed. Here, the housing includes a cover plate. The cover plate includes a brush which comes into contact with the commutator. The commutator includes a serration portion which is disposed on an outer circumferential surface of the commutator and comes into contact with the brush.

The serration portion may include grooves arranged in a circumferential direction on the basis of an axial center of the commutator.

A plurality of such grooves may be arranged in an axial direction of the rotating shaft.

A height from a bottom end to a top end of the serration portion on the basis of an axial direction of the rotating shaft may be higher than a height from a bottom surface to a top surface of the brush.

A top end of the serration portion may be disposed to be higher than a top end of the brush on the basis of an axial direction of the rotating shaft, and a bottom end of the serration portion may be disposed to be lower than the top end of the brush.

The commutator may include a commutator body and a commutator piece disposed on an outer circumferential surface of the commutator body, and the serration portion may be disposed on an outer surface of the commutator piece.

The commutator may include a hook portion, and the serration portion may be disposed between a top end of the commutator piece and a bottom end of the hook portion on the basis of an axial direction of the rotating shaft.

A boundary between a front surface of the brush, which comes into contact with the serration portion, and a top surface of the brush may be an inclined surface, and a boundary between the front surface of the brush, which comes into contact with the serration portion, and a bottom surface of the brush may be an inclined surface.

The brush may include protruding portions which are disposed on a front surface of the brush and arranged in grooves of the serration portion.

Advantageous Effects

According to embodiments, there is provided an advantageous effect of inhibiting foreign substances caused by abrasion of a brush at a contact part between the brush and a commutator while a motor is initially driven by forming a curvature radius of a curved portion, which comes into contact with the commutator, to be equal to a curvature radius of the commutator and including cutting portions, which do not come into contact with the commutator, on both sides of the curved portion.

There is also provided an advantageous effect of inhibiting slips, which may occur between the commutator and the brush due to vibration on the basis of an axial direction of the motor, by using a serration portion disposed on the commutator.

MODES OF THE INVENTION

Hereinafter, exemplary embodiments of the present invention will be described in detail with reference to the attached drawings. The purpose, particular advantages, and novel features of the present invention will be more clearly understood from the following detailed description and exemplary embodiments related to the attached drawings. Also, the terms used in the specification and the claims should not be limited to general or lexical meanings and should be interpreted as meanings and concepts coinciding with the technical concept of the present invention on the basis of a principle in which the inventor can appropriately define the concept of the terms to describe the invention in the best manner. Also, a detailed description on well-known related art that may unnecessarily obscure the essentials of the present invention will be omitted.

The terms including ordinal numbers such as "second," "first," and the like may be used for describing a variety of components. However, the components are not limited by the terms. The terms are used only for distinguishing one component from another component. For example, without departing from the scope of the present invention, a second component may be referred to as a first component, and similarly, a first component may be referred to as a second component. The term "and/or" includes any and all combinations of one or a plurality of associated listed items.

Figure 1:
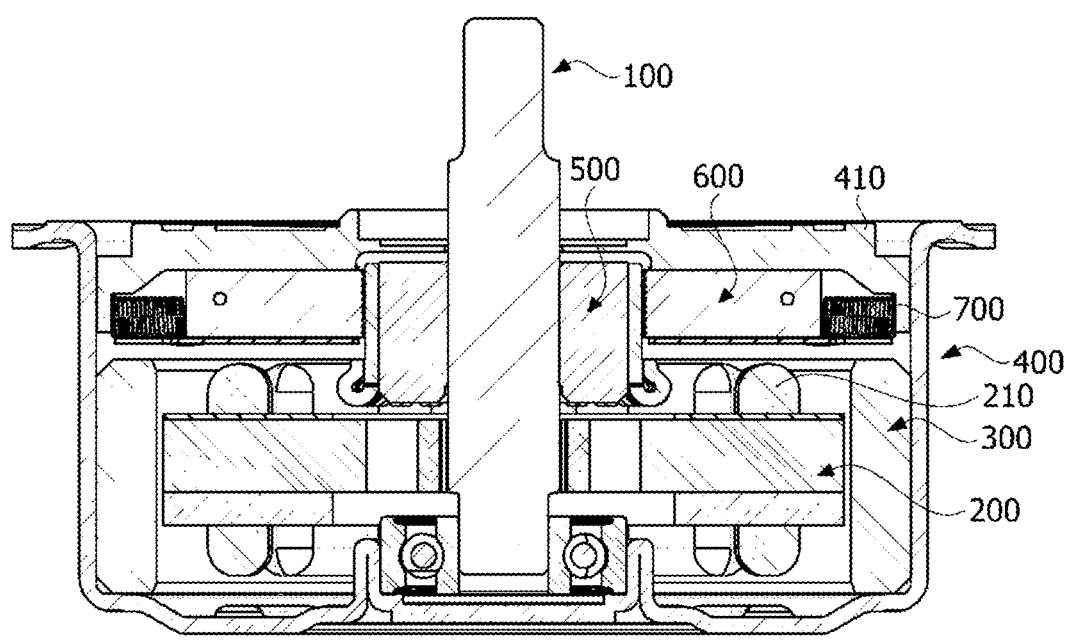
FIG. 1 is a view of a motor according to an embodiment.

FIG. 1 is a view of a motor according to an embodiment.

Referring to FIG. 1, the motor according to the embodiment may include a rotating shaft 100, a rotor 200, a stator 300, and a housing 400.

The rotor 200 is disposed inside the stator 300. The rotor 200 includes a rotor core combined with a center of the rotating shaft 100. The rotor 200 may include a plurality of tees arranged on a perimeter of the rotor core. Here, the tees may be arranged to face the stator 300. A coil 210 is wound on each of the tees. An insulator is mounted on the tees and insulates the tees from the coil 210.

The stator 300 may be combined with an inside of the housing 400 and may include a plurality of magnets. The magnets and the coil 210 wound on the rotor 200 form a rotating magnetic field. The magnets may be arranged such that N poles and S poles are alternately located around the rotating shaft 100 on the basis of a circumferential direction. Meanwhile, the stator 300 may be manufactured by combining a plurality of divided cores or manufactured to have a single core form.

When a current is supplied to the coil 210, an electrical interaction with the magnets of the stator 300 is caused such that the rotor 200 rotates. When the rotor 200 rotates, the rotating shaft 100 also rotates. Here, the rotating shaft 100 may be supported by a bearing.

Meanwhile, a commutator 500 and a brush 600 are necessary for supplying an electric current to the rotating rotor 200.

The commutator 500 is combined with the rotating shaft 100. Also, the commutator 500 may be disposed above the rotor 200. Also, the commutator 500 is electrically connected to the coil 210.

Meanwhile, the brush 600 comes into contact with the commutator 500 and applies an electric current to the coil 210.

The housing 400 accommodates the rotor 200 and the stator 300. Also, the housing 400 includes a cover plate 410. The cover plate 410 covers an open top of the housing 400. The brush 600 is installed on a bottom surface of the cover plate 410. The brush 600 is accommodated in a case. An elastic member 700 may be disposed inside the case in which the brush 600 is accommodated. Also, the case, in which the brush 600 is accommodated, is combined with the cover plate 410. When an external power source is connected to a terminal disposed on the cover plate 410, electricity is supplied to the brush 600 through a capacitor disposed on the cover plate 410. The brush 600 supplies electricity to the coil 210 through the commutator 500.

Figure 2:
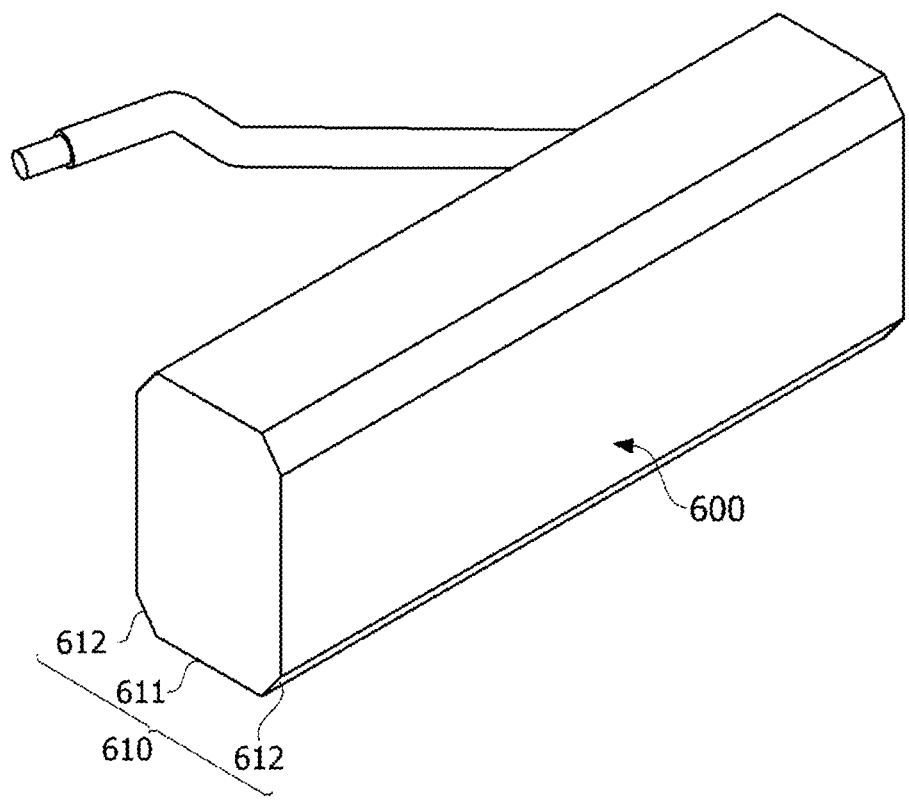
FIG. 2 is a view illustrating a brush.
Figure 3:
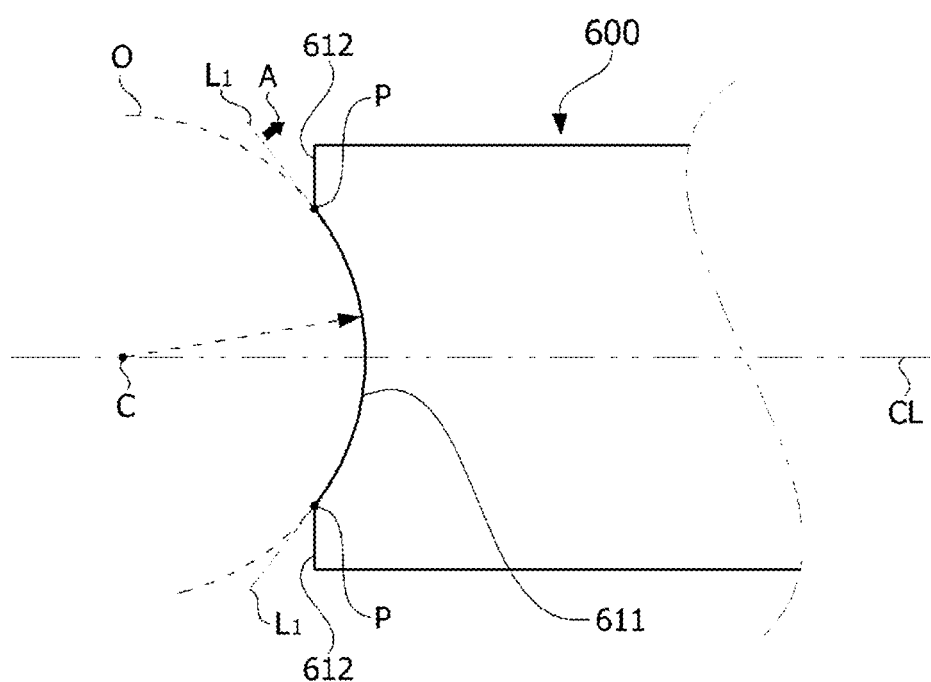
FIG. 3 is a view illustrating a curved portion and a cutting portion of a front surface.

FIG. 2 is a view illustrating the brush, and FIG. 3 is a view illustrating a curved portion and cutting portions of a front surface.

Referring to FIGS. 2 and 3, the brush 600 includes a front surface 610 which comes into contact with the commutator 500. While the front surface 610 is in contact with the commutator 500, the brush 600 supplies an electric current to the commutator 500.

The front surface 610 may include a curved portion 611 and cutting portions 612.

The curved portion 611 is a part which comes into contact with the commutator 500. While the commutator 500, which rotates interworking with the rotating shaft 100, rotates, the curved portion 611 comes into contact with the commutator 500.

The curved portion 611 may be formed to have the same curvature radius as a curvature radius of the commutator 500. Also, the curved portion 611 may be disposed in a center of the brush 600. The cutting portions 612 may be disposed on both sides of the curved portion 611.

The cutting portions 612 may be disposed from an edge of the curved portion 611 to an edge of the front surface 610. The cutting portion 612 may be configured as a flat surface. However, the embodiment is not limited thereto and the cutting portion 612 may be formed as a curved surface.

The cutting portion 612 is bent and disposed at the edge of the curved portion 611 on the basis of a width direction of the brush 600. Accordingly, the cutting portion 612 does not come into contact with the commutator 500. As shown in FIG. 3, the cutting portion 612 may be disposed on a side opposite to the commutator 500 on the basis of a second reference line L1. Here, the second reference line L1 corresponds to a virtual tangent drawn at a place where an edge P of the curved portion 611 is located on a reference circle O formed along an outer circumferential surface of the commutator 500.

Also, the cutting portions 612 disposed on both sides of the curved portion 611 may be symmetrically disposed on the basis of a first reference line CL which passes a center C of the commutator 500 and a center of the curved portion 611.

While the curved portion 611 is in contact with the commutator 500, the cutting portion 612 does not come into contact with the commutator 500. Accordingly, it is possible to inhibit particles from being generated by an edge of the brush 600 being worn out as the curved portion 611 is abraded.

That is, even when the curved portion 611 is designed to have the same curvature radius as the curvature radius of the commutator 500, both edges of the curved portion 611 may firstly come into contact with the commutator 500 due to assembling tolerance. The motor according to the embodiment fundamentally inhibits foreign substances from being generated by breakage or abrasion of both edges of the curved portion 611 of the brush 600, which may first come into contact with the commutator 500 and thus be broken or abraded to produce foreign substances, by embodying the cutting portions 612, which do not come into contact with the commutator 500, on the both edges of the curved portion 611. Also, the motor according to the embodiment inhibits a short circuit from being generated by insertion of foreign substances between the curved portion 611 and the commutator 500 by increasing adhesion between the curved portion 611 and the commutator 500.

Figure 4:
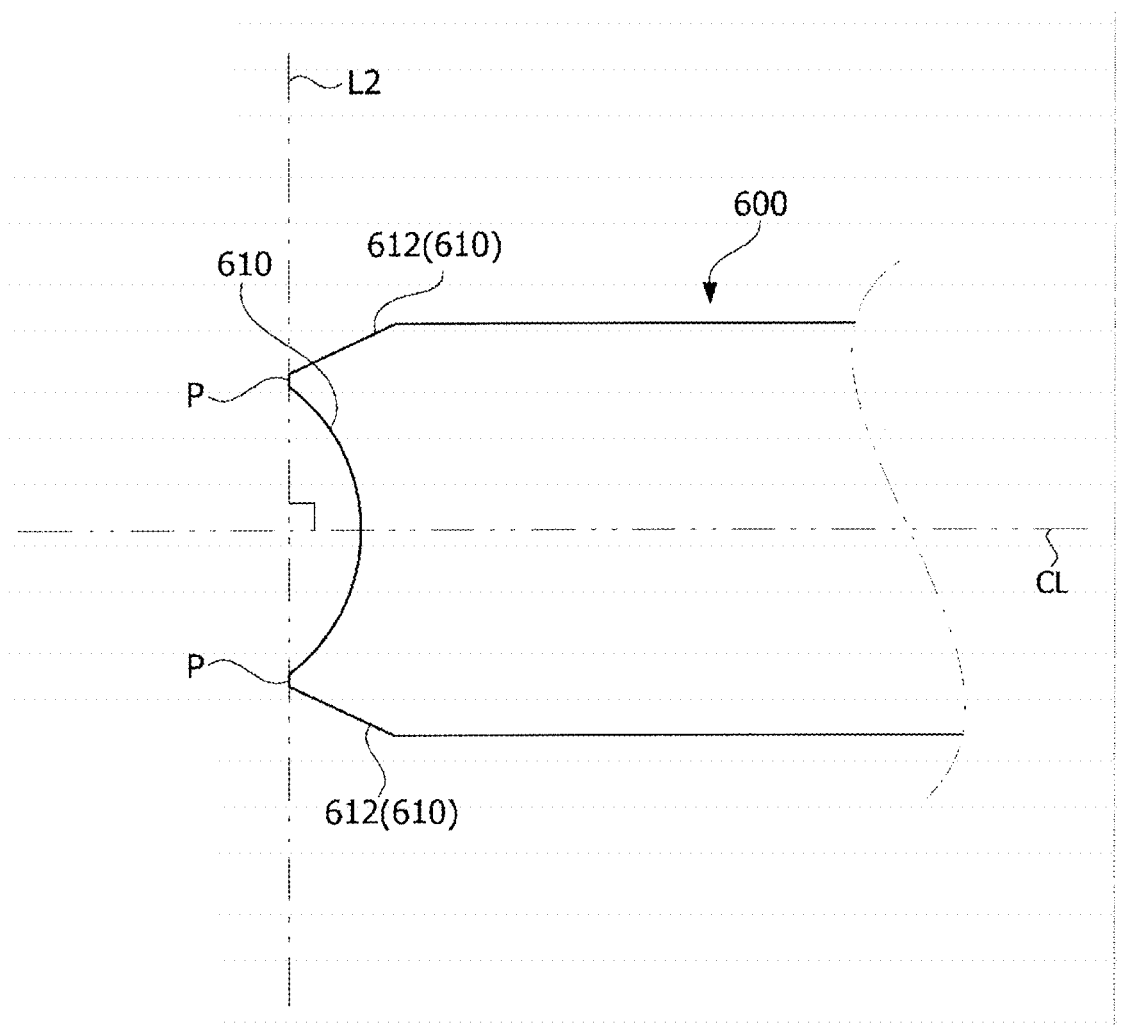
FIG. 4 is a view illustrating a brush of a motor according to another embodiment.

FIG. 4 is a view illustrating a brush of a motor according to another embodiment.

Referring to FIG. 4, the cutting portions 612 may be arranged to be inclined on the basis of a third reference line L2 which is vertical to the first reference line CL and passes the edge P of the curved portion 611.

The cutting portions 612 may be formed through a process of forming the curved portion 611 on the front surface 610 and then cutting both sides of the front surface 610. Although the embodiment has been described while exemplifying the above-described two shapes of cutting portions 612, the shape of the cutting portions 612 is not limited thereto and a variety of modifications may be made within a range of being bent at the curved portion 611 and not coming in contact with the commutator 500.

Figure 5:
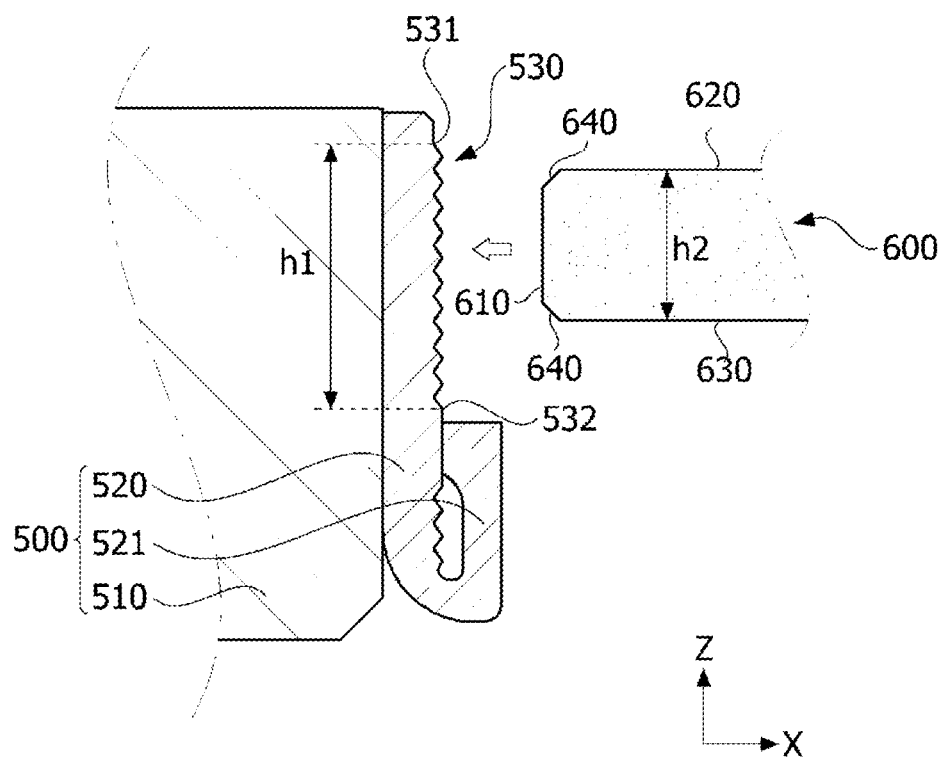
FIG. 5 is a view illustrating a serration portion disposed on a commutator.

FIG. 5 is a view illustrating a serration portion disposed on the commutator. Hereinafter, a Z-axis direction shown in the drawings refers to an axial direction of the motor and an X-axis direction shown in the drawings refers to a radial direction of the motor.

Referring to FIG. 5, the commutator 500 may include a commutator body 510 and a commutator piece 520. The commutator body 510 has a cylindrical shape. Also, a hole, through which the rotating shaft 100 passes, may be disposed in a center of the commutator body 510. The commutator piece 520 is disposed on an outer circumferential surface of the commutator body 510. The commutator piece 520 is formed of a metal material and comes into direct contact with the commutator 500. A bottom end of the commutator piece 520 may be bent and form a hook portion 521. The coil 210 wound on the rotor 200 may be fused and connected to the hook portion 521.

The serration portion 530 may be arranged on a surface of the commutator piece 520. The serration portion 530 may be embodied to have a shape in which concave portions and convex portions are alternately repeated. Accordingly, the serration portion 530 may include a plurality of grooves, and each of the grooves may be disposed in a circumferential direction on the basis of an axial center of the commutator 500. That is, the grooves of the serration portion 530 are aligned in a direction perpendicular to an axial direction of the rotating shaft 100. Also, the plurality of grooves of the serration portion 530 may be arranged along the axial direction of the rotating shaft 100.

Referring to FIG. 5, on the basis of the axial direction of the rotating shaft 100 (z-axis direction of FIG. 5), a height h1 from a bottom end 532 to a top end 531 of the serration portion 530 may be at least greater than a height h2 from a bottom surface 630 to a top surface 620 of the brush 600. This is to increase contact properties between the serration portion 530 and the brush 600 in consideration of abrasion of the brush 600.

Figure 6:
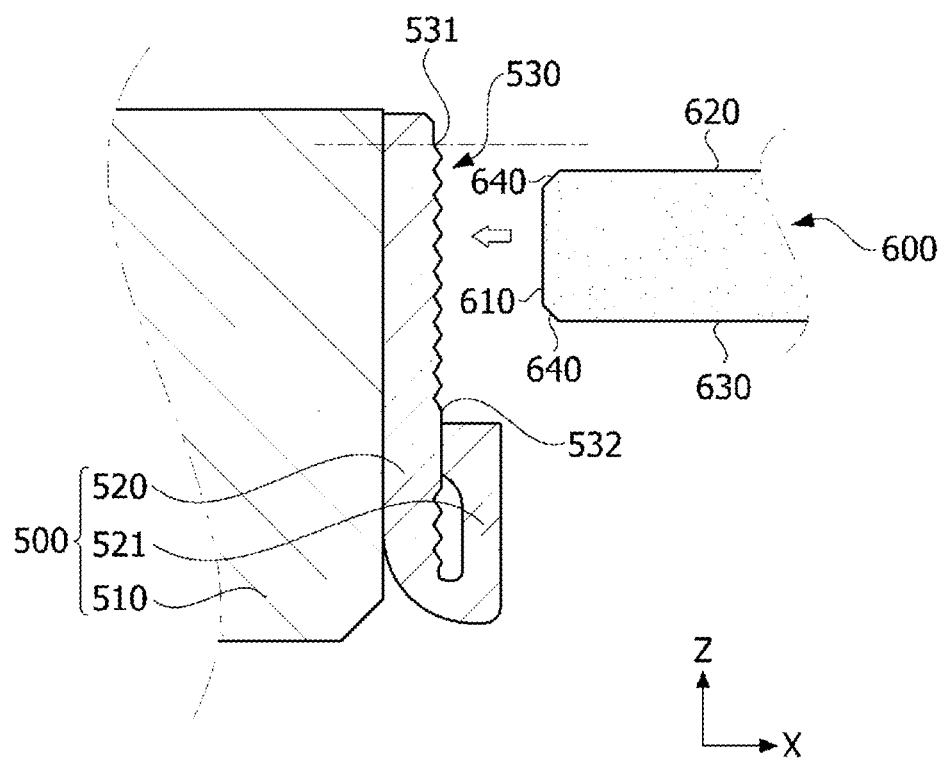
FIG. 6 is a view illustrating a position of the serration portion of the commutator.

FIG. 6 is a view illustrating a position of the serration portion of the commutator.

Referring to FIGS. 1 and 6, on the basis of the axial direction of the rotating shaft 100, the serration portion 530 may be disposed between the hook portion 521 and a top end of the commutator piece 520. Also, on the basis of the axial direction of the rotating shaft 100, the top end 531 of the serration portion 530 may be located to be higher than the top surface 620 of the brush 600. Also, the bottom end 532 of the serration portion 530 may be located to be lower than the bottom surface 630 of the brush 600. This is to increase contact properties between the serration portion 530 and the brush 600 in consideration of abrasion of the brush 600.

Figure 7:
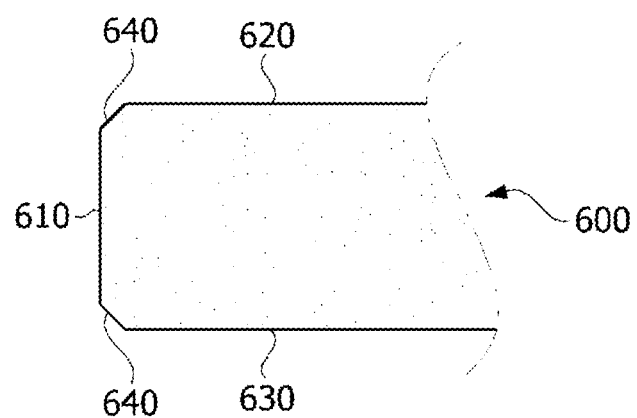
FIG. 7 is a view illustrating the brush.

FIG. 7 is a view illustrating the brush.

Referring to FIG. 7, the front surface 610 of the brush 600 comes into contact with the serration portion 530. A boundary between the top surface 620 and the front surface 610 of the brush 600 may be formed as an inclined surface 640 having a cut shape. Also, a boundary between the bottom surface 630 and the front surface 610 of the brush 600 may also be formed as the inclined surface 640 having a cut shape. This is in consideration of abrasion of the front surface 610 of the brush 600 which comes into contact with the serration portion 530.

Figure 8:
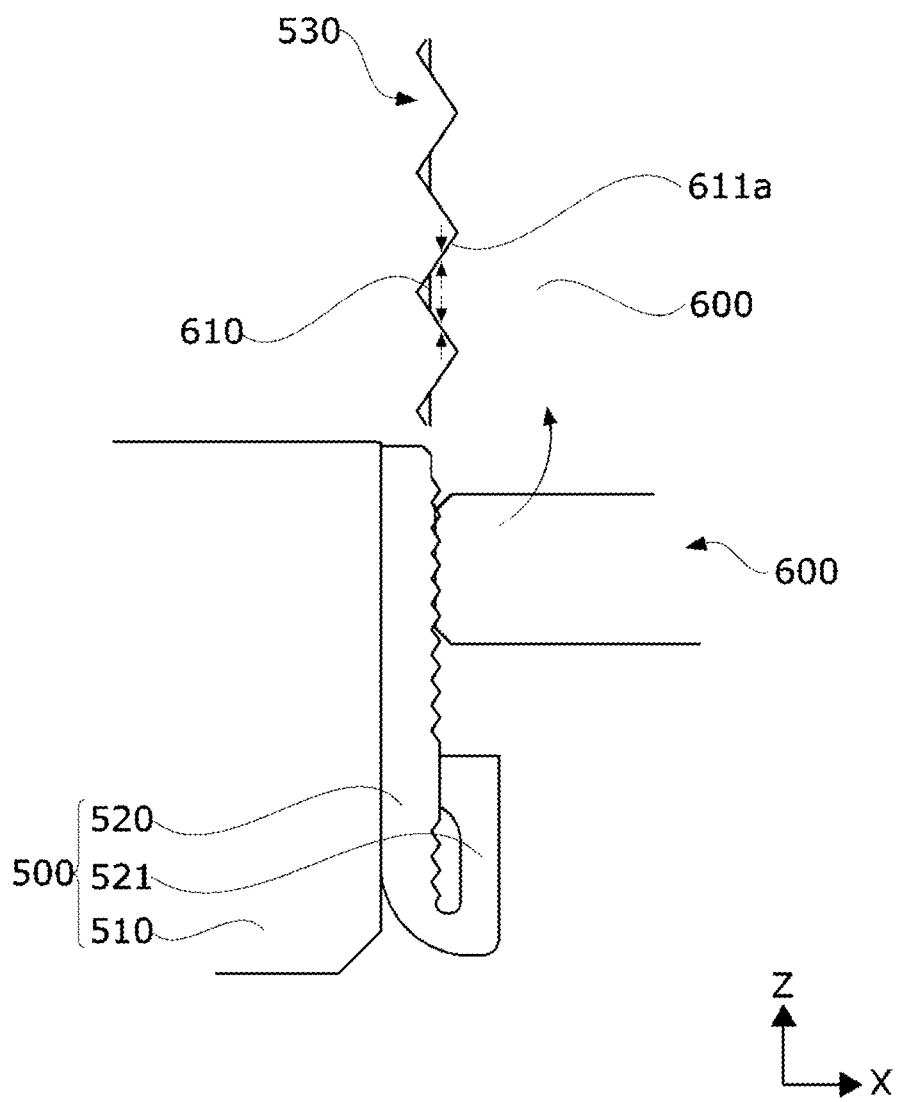
FIG. 8 is a view illustrating a state in which the brush is in contact with the serration portion of the commutator.

FIG. 8 is a view illustrating a state in which the brush is in contact with the serration portion of the commutator.

Referring to FIG. 8, when the brush 600 repetitively rotates while the serration portion 530 and the brush 600 come into contact with each other, the front surface 610 of the brush 600 is worn out. When abrasion continues, protruding portions 611a are formed on the front surface 610 of the brush 600. The protruding portions 611a have a shape located in the grooves of the serration portion 530. Since the grooves of the serration portion 530 are aligned in a direction perpendicular to the axial direction of the rotating shaft 100 and arranged along a circumferential direction of the commutator 500, the commutator 500 may stably rotate while being in contact with the brush 600. Here, it is possible to reduce vibrations generated in the radial direction of the motor by using an elastic member 700 which pressurizes a rear surface of the brush 600. Also, even when vibrations are generated in the axial direction of the motor, since the grooves of the serration portion 530 and the protruding portions 611a are mutually bound on the basis of the axial direction of the rotating shaft 100, it is possible to inhibit slips from occurring between the commutator 500 and the front surface 610 of the brush 600 in the axial direction of the rotating shaft 100.

The grooves of the serration portion 530 and the protruding portions 611a of the brush 600 are configured to increase a contact area between the commutator 500 and the brush 600. Accordingly, it is possible to increase efficiency of an electric current supplied to the motor.

As described above, the motor according to one exemplary embodiment of the present invention has been described in detail with reference to the attached drawings. It should be noted that the above-described one embodiment of the present invention is merely an example in all aspects and is not intended to be limitative, and the scope of the present invention will be defined by the following claims rather than the above detailed description. Also, it should be interpreted that all modifications or modifiable shapes derived from the meaning and scope of the claims and equivalents thereof are included in the scope of the present invention.

DESCRIPTION OF REFERENCE NUMERALS

100: rotating shaft, 200: rotor, 300: stator, 400: housing, 500: commutator, 510: commutator body, 520: commutator piece, 530: serration portion, 600: brush, 610: front surface, 611a: protruding portion, 610: front surface, 611: curved portion, 612: cutting portion, 620: top surface, 630: bottom surface, 640: inclined surface

The invention claimed is:

1. A rotor comprising:
a rotating shaft;
a rotor comprising a hole in which the rotating shaft is disposed;
a stator disposed outside the rotor;
a housing that accommodates the rotor and the stator; and
a commutator comprising a hole in which the rotating shaft is disposed,
wherein the housing comprises a cover plate,
wherein the cover plate comprises a brush that comes into contact with the commutator,
wherein the commutator includes a commutator body, a commutator piece disposed on an outer circumferential surface of the commutator body, and a serration portion arranged on a surface of the commutator piece,
wherein the serration portion includes a plurality of grooves aligned in a direction perpendicular to an axial direction of the rotating shaft,
wherein a height from a bottom end to a top end of the serration portion in an axial direction of the rotating shaft is higher than a height from a bottom surface to a top surface of the brush,
wherein a front surface of the brush comprises a curved portion, which comes into contact with the serration portion of the commutator, and cutting portions that are formed by being bent at the curved portion and do not come into contact with the commutator,
wherein a plurality of protruding portions is formed on the front surface of the brush, the protruding portions being located in the grooves of the serration portion,
wherein a boundary between the top surface of the brush and the front surface of the brush is formed as an inclined surface having a shape of a cutting edge,
wherein a boundary between the bottom surface of the brush and the front surface of the brush is formed as the inclined surface having a shape of a cutting edge, an abrasion of the front surface of the brush coming into contact with the serration portion,
wherein the curved portion is disposed at a center of the brush, and the cutting portions are disposed on both sides of the curved portion, the curved portion and the cutting portions being disposed in a width direction of the brush,
wherein the cutting portions are formed to be flat surfaces, and
wherein a curvature radius of the curved portion is equal to a curvature radius of the commutator,
wherein the cutting portions are symmetrically disposed with respect to a first reference line that passes a center of the commutator and a center of the curved portion,
wherein the cutting portions are disposed opposite to the commutator on a reference circle formed along an outer circumferential surface of the commutator and a second reference line that is a tangent at an intersection point between corners that are boundaries between the curved portion and the cutting portions, and
wherein the curved portion comes into contact with the serration portion of the commutator and the cutting portions do not contact with the commutator.

* * * * *